United States Patent

Herzog et al.

[11] Patent Number: 5,321,993
[45] Date of Patent: Jun. 21, 1994

[54] TRANSMISSION SHIFT CONTROL APPARATUS

[75] Inventors: David K. Herzog, Sterling Heights; Willem S. Haven, Waterford; Frederick B. Hummer; Syed T. Razzacki, both of Troy, all of Mich.

[73] Assignee: Chrysler Corporation, Highland Park, Mich.

[21] Appl. No.: 666,778

[22] Filed: Mar. 8, 1991

[51] Int. Cl.⁵ .................. B60K 20/00; F16C 1/12
[52] U.S. Cl. ................. 74/473 R; 74/476; 74/501.6
[58] Field of Search ......... 74/473 R, 476, 473 P, 74/500.5, 501.6

[56] References Cited

U.S. PATENT DOCUMENTS

| | | | |
|---|---|---|---|
| 2,280,047 | 4/1942 | Nampa | 74/473 R |
| 4,143,560 | 3/1979 | Kinkade et al. | 74/473 R |
| 4,270,403 | 6/1981 | West | 74/473 R |
| 4,275,614 | 6/1981 | Okubo et al. | 74/476 |
| 4,483,211 | 11/1984 | Hurlow | 74/473 R |
| 4,583,417 | 4/1986 | Hurlow | 74/473 R |
| 4,669,329 | 6/1987 | Suzuki | 74/473 R |
| 4,712,640 | 12/1987 | Leigh-Monstevens et al. | 74/473 R |
| 4,916,964 | 4/1990 | Crack | 74/473 P |

FOREIGN PATENT DOCUMENTS

| | | | |
|---|---|---|---|
| 60-179339 | 9/1985 | Japan | 74/473 R |
| 1442435 | 12/1988 | U.S.S.R. | 74/473 R |
| 1595342 | 8/1981 | United Kingdom | 74/473 R |

Primary Examiner—Allan D. Herrmann
Assistant Examiner—David W. Laub
Attorney, Agent, or Firm—Edward P. Barthel

[57] ABSTRACT

A manual transmission shift control apparatus wherein dual cables lead from a floor-mounted shift control lever assembly directly, i.e., without bending, to dual select and shift shafts operatively connected to the transmission. The dual shafts are rotatably mounted and operated in a housing on top of the transmission. A selector mechanism bearing a shift finger is rotatably and slidably mounted on a shaft in the housing, such that, through suitable linkage, the shift finger is selectively rotated by the rotated select shaft into ½, ¾, or 5/R shift positions, and then slid by the rotated shift shaft into the 1, 3 or 5 shift ratios in one direction, or the 2, 4 or R shift ratios in the other direction.

6 Claims, 7 Drawing Sheets

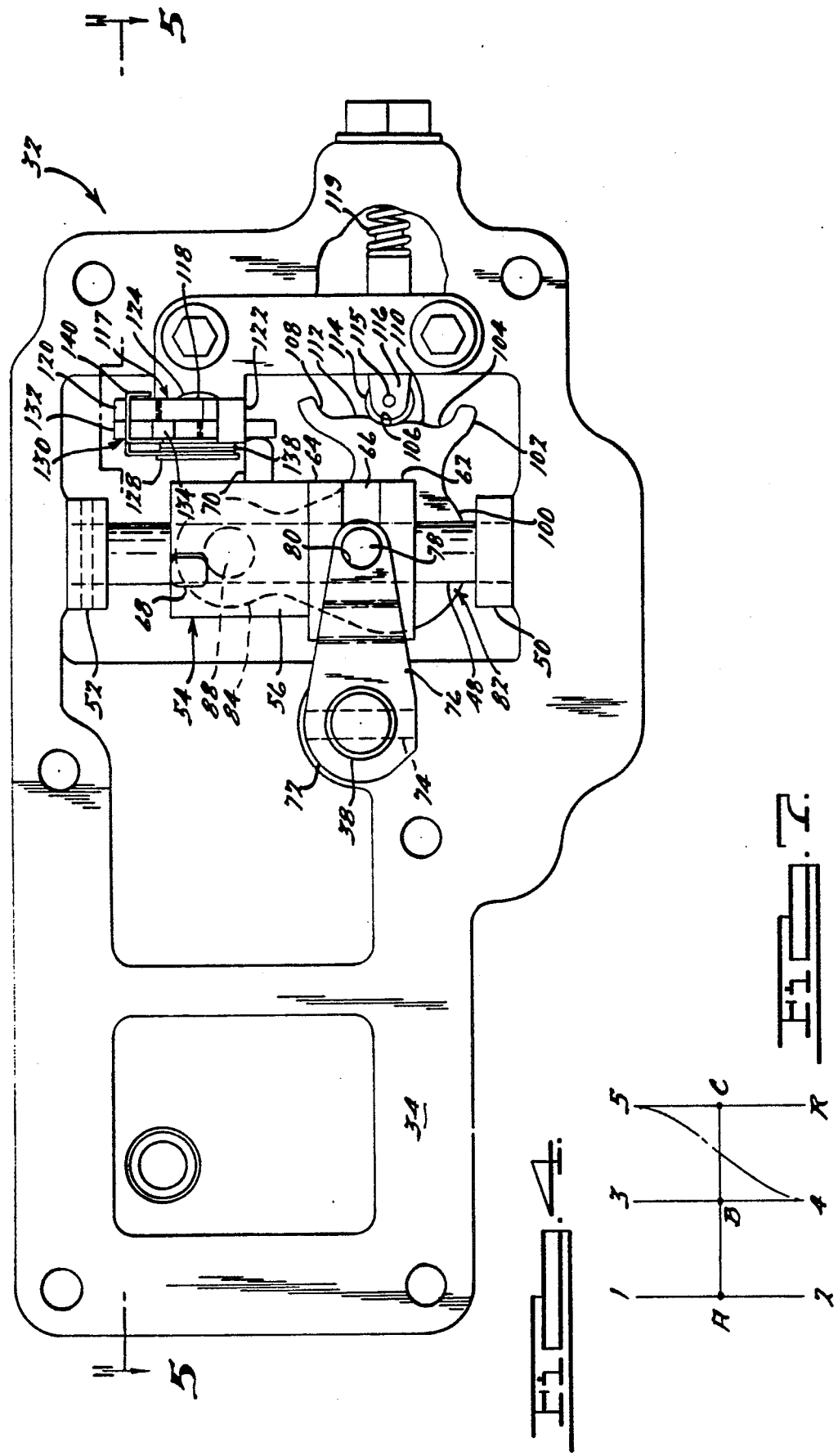

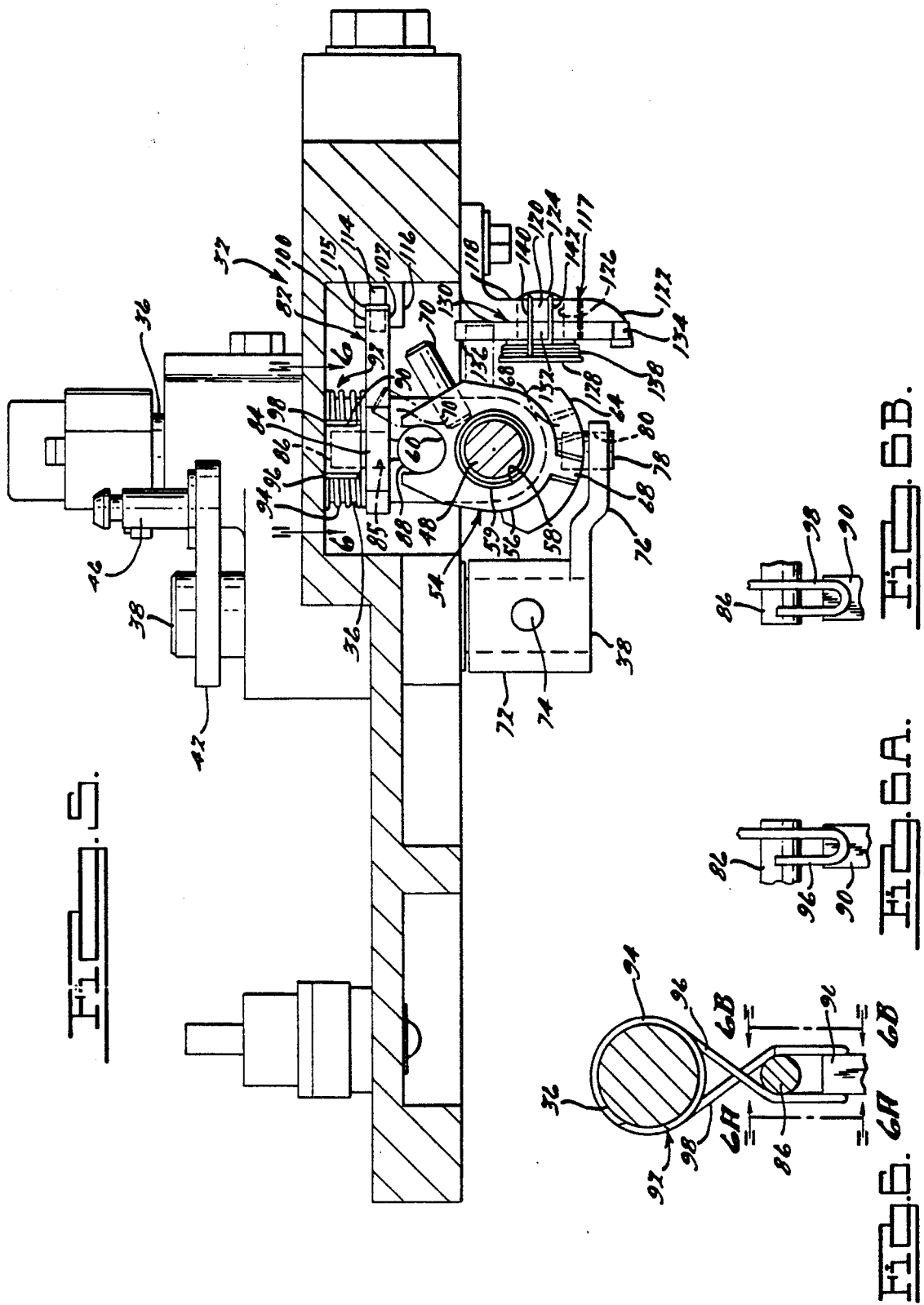

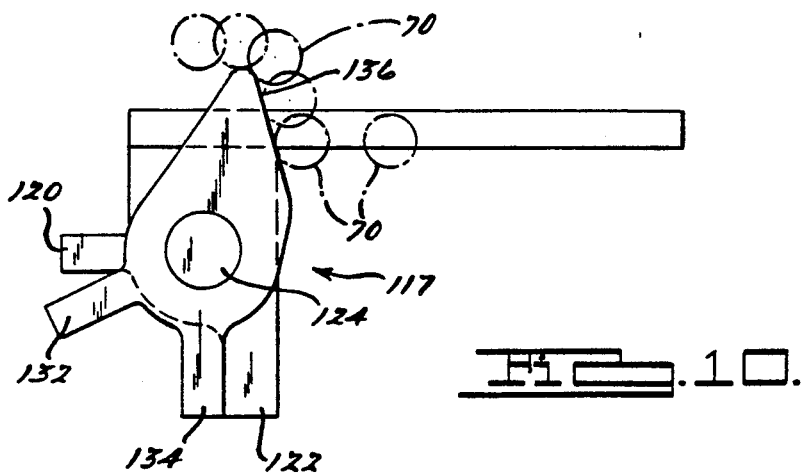
FIG. 10.
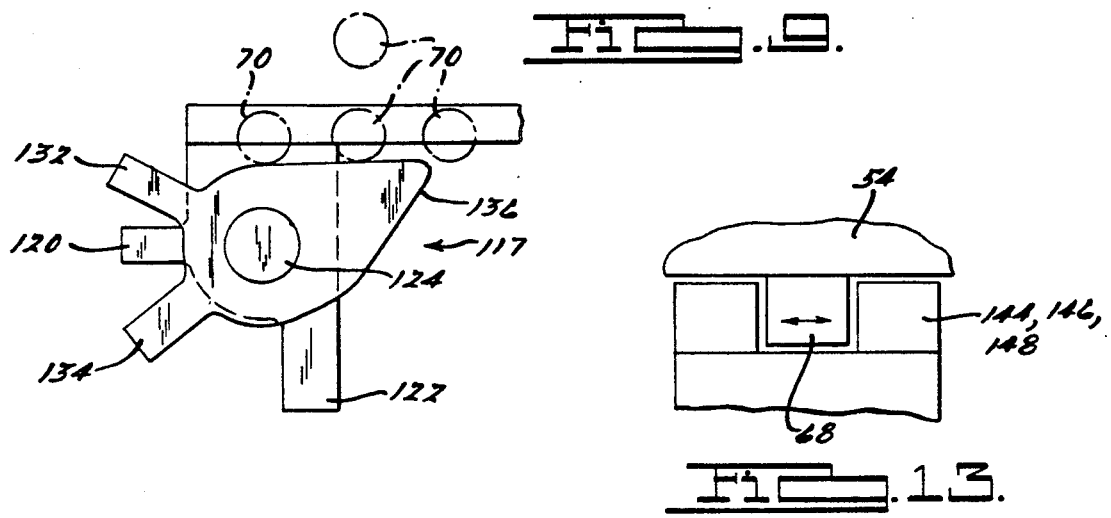
FIG. 9.
FIG. 13.
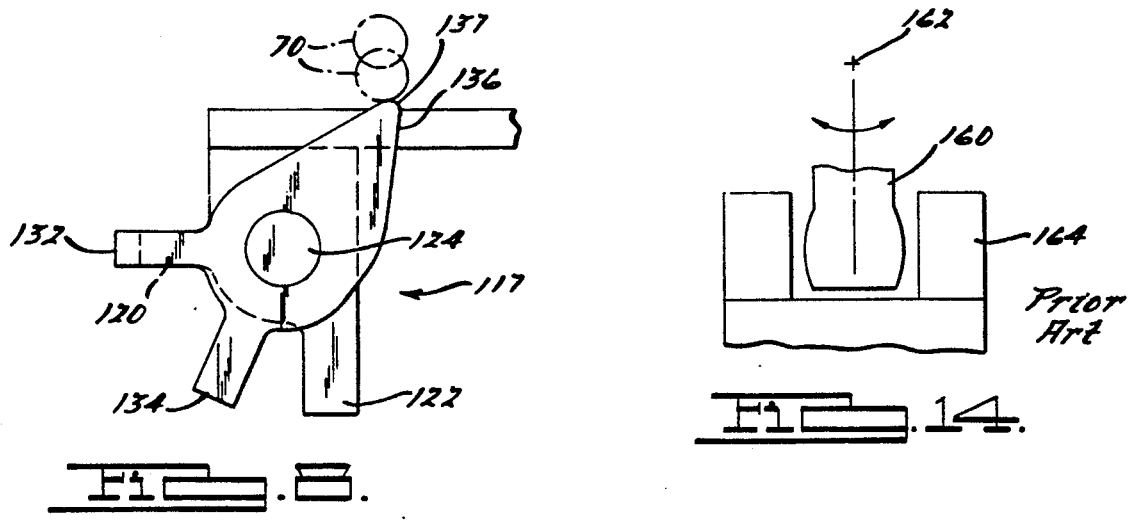
FIG. 8.
FIG. 14.

TRANSMISSION SHIFT CONTROL APPARATUS

TECHNICAL FIELD

This invention relates generally to automotive transmission shift control apparatus and, more particularly, to a manual transmission shift control apparatus having rotatable double selector and shift shafts and slidable shift lug design.

BACKGROUND ART

Heretofore, transmission select and/or shift shafts have generally consisted of sliding types. For example, each of Hurlow U.S. Pat. No. 4,583,417, Suzuki U.S. Pat. No. 4,669,329, and Kinkade, et al U.S. Pat. No. 4,143,560 discloses a common or single sliding and rotational shift shaft or rod.

Prior remote shift control arrangements, which have been utilized in conjunction with double rotational select and shift shafts, have not generally utilized flexible push-pull cables leading substantially directly from the remote shift control lever unit to the double shafts. For example, Crack U.S. Pat. No. 4,916,964 discloses flexible cables which must traverse substantially right angle turns therebetween, with a combination torque tube flexible cable serving as the select shaft rotating means.

West U.S. Pat. No. 4,270,403 discloses matched motion translators in master and slave units, which are rotationally and translationally guided in their respective units, and interconnected by dual push-pull cables. Matched driving and driven (gear select shift rail) members having rotary and linear motions are disclosed in Leigh-Monstevens U.S. Pat. No. 4,712,640.

U.S. Pat. No. 4,483,211 includes an upright shaft rotatable by a first cable via a crank arm to, in turn, rotate an inner crank arm and, thereby, slide a rail selector sleeve mounted around a gearshift shaft. The latter, with the rail selector sleeve keyed thereto and free to slide longitudinally thereof, is rotated by an upright pivotable crank arm actuated by a second cable.

Furthermore, many internal shift mechanisms have heretofore comprised mechanisms having rotational rail selector movement, in contrast to linear movement, requiring longer shift finger design and consequent increased size an weight of associated parts, in addition to increased frictional losses resulting from a sliding selector member being pushed by the rotating shift finger.

DISCLOSURE OF THE INVENTION

A general object of the invention is to provide an improved transmission shift control mechanism. Another object of the invention is to provide such an improved shift control mechanism wherein each of double selector and shift shafts are rotatably actuated by a pair of push-pull flexible cables which extend thereto substantially straightforwardly from the remote floor-mounted shift control lever.

A further object of the invention is to provide a shift control mechanism wherein rotational selector and shift shafts are operatively connected to an internal shift mechanism which slidably moves a corresponding shift lug to actuate one of FIRST/SECOND, or THIRD/FOURTH, or FIFTH/REVERSE gear ratios.

These and other objects and advantages will be more apparent when reference is made to the following drawings and accompanying description.

BRIEF DESCRIPTION OF THE DRAWINGS

FIG. 4 is a bottom view of the driven portion of the FIG. 1 structure;

FIG. 5 is a cross-sectional view taken along the plane of the line 5—5 of FIG. 4, and looking in the direction of the arrows;

FIG. 6 is a cross-sectional view taken along the plane of the line 6—6 of FIG. 56, and looking in the direction of the arrows;

FIG. 6A an 6B are respective side views taken along the planes of the lines 6A—6A and 6B—6B of FIG. 6, and looking in the direction of the arrows;

FIG. 7 is a diagrammatic view showing operational characteristics of the invention;

FIGS. 8, 9 and 10 are operational views of a subassembly of the shift control apparatus;

FIG. 13 is a fragmentary cross-sectional view illustrating the operational interconnection of an element of the invention with the FIG. 11 structure; and FIG. 14 is a fragmentary cross-sectional view similar to FIG. 13 illustrating the comparable interconnection of a prior art arrangement.

BEST MODE OF CARRYING OUT THE INVENTION

Figure 1:
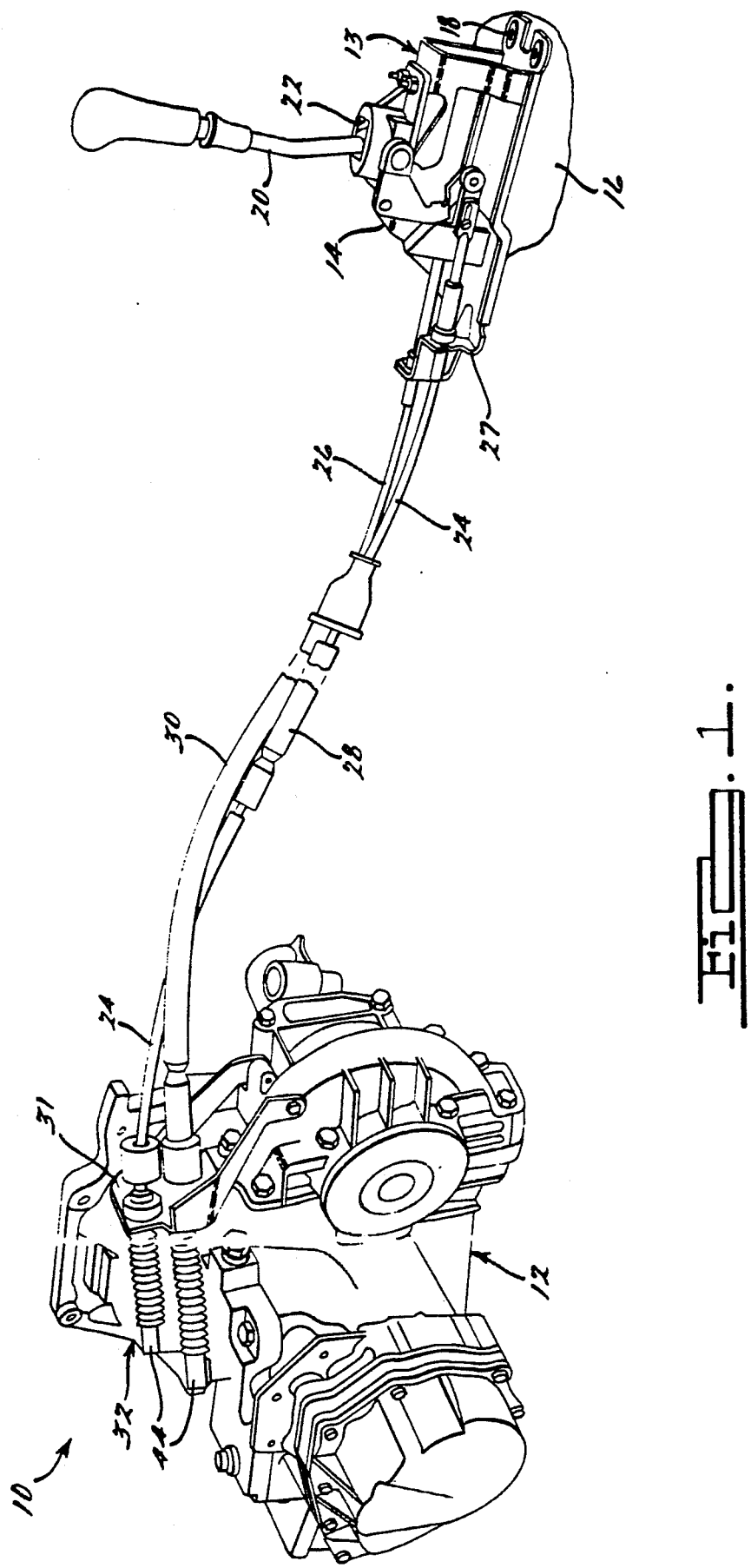
FIG. 1 is a perspective view of the master or driving and slave or driven components of a transmission shift control apparatus interconnected by a pair of flexible cables.

Referring now to the drawings in greater detail, FIG. 1 illustrates a five-speed and reverse manual shift control apparatus 10 for a manual transmission 12. The shift control apparatus 10 includes a shifter assembly 13 having a stamped housing 14 adapted to being secured to the floor 16 by suitable fasteners 18, a control lever 20 extending through an opening 22 formed in the top of the housing 14, a flexible select push-pull cable 24 and a flexible shift push-pull cable 26 operatively connected to the lower end of the control lever 20 in the usual manner (not shown) and extending therefrom through the firewall 27 and within respective protective outer sheaves 28 and 30 through a support bracket 31 to a shift mechanism 32 operatively mounted on the top of the transmission 12.

The shift mechanism 32 includes a cover member 34 (FIGS. 2 and 3) having two vertical select and shift shafts 36 and 38, respectively, rotatably mounted through the cover, with a straight lever arm 40 and an arcuate-shaped lever arm 42 each secured at one end thereof to the extended ends of the respective shafts 36 and 38. The ends of the cables 24 and 26 include suitable connectors 44 adapted to being pivotally mounted on mounting pins 46 secured to the distal ends of the respective lever arms 40 and 42. It may be noted from FIGS. 1 and 2 that the cables 24 and 26 extend substantially along straight paths from the shifter assembly 13 to the respective mounting pins 46.

Referring now to FIGS. 4 and 5, the inside of the cover member 34 is shown to include a fixed circular sectioned rod 48 extending laterally across the cover member with the oppositely disposed ends thereof secured in mounting flanges 50 and 52. A selector mechanism 54 includes a substantially cylindrical spindle member 56 having a central opening 58 formed therethrough, having suitable bushing means 59 mounted therein adaptable to slidably and rotationally mounting the selector mechanism 54 on the rod 48. A U-shaped trough 60 is formed the full length of the upper side of the member, with its axis parallel to the axis of the central opening 58. A pair of spaced-apart arcuate-shaped flanges 62 and 64, having peripheral surfaces concentric with the spindle member 56, are formed adjacent one end of the underside of the member 56 forming a slot 66 threrebetween. An axially extending, four-sided finger 68 is formed adjacent the other end of the underside of the spindle member 56. A round pin 70 is formed to extend at a predetermined angle from a side of the member 56 at a longitudinal location intermediate the planes of the finger 68 and the slot 66. The axis of the pin 70 intersects a line connecting the axes of the trough 60 and the central opening 58 at a point closer to the latter.

A sleeve-like member 72 is secured around the inner end of the rotatably mounted shift shaft 38 by a press-fitted pin 74. A stepped lever arm 76 extends from the inner end portion of the sleeve-like member 72, with a follower pin 78 secured in an opening 80 formed adjacent the distal end of the arm 76 and extending into the slot 66 between the flanges 62 and 64.

A plate member 82 is secured to the inner end of the rotatably mounted shift shaft 36 adjacent the U-shaped trough 60. The plate member 82 includes a first arm portion 84 extending in a direction substantially along the length of the trough 60, and has an opening 85 formed adjacent the distal end thereof. A round spring actuator member 86 is press-fitted in the opening 85 so as to extend upwardly therefrom. A ball-shaped member 88 extends downwardly from the member 86 into the U-shaped trough 60, adapted to at times rotate the selector mechanism 54 through a predetermined arc and at times to slide in the trough 60 when the selector mechanism 54 is slid along the rod 48, for a purpose to be explained.

A fixed abutment 90 is formed to extend from an inner wall of the cover member 34 to a point in close proximity to the spring actuator member 86. A contoured torsion spring 92 is formed so as to have a round center portion 94 mounted around the select shaft 36, intermediate the plate member 82 and the inner surface of the cover member 34. The spring 92 further includes a pair of legs 96 and 98 extending from the center portion 94 and crossing each other intermediate the select shaft 36 and the spring actuator member 86, to straddle the latter (FIGS. 5 and 6) and extend to the oppositely disposed sides of the fixed abutment 90. The force of the spring 92 is such that the legs 96 and 98 tend to spring outwardly from each other and, by virtue of their crossover, are urged into a tight grip against the respective sides of the fixed abutment 90.

The plate member 82 further includes a second arm portion 100 extending substantially at a right angle with respect to the first arm portion 84, in a direction away from the select shaft 36. A flared portion 102 is formed on the distal end of the second arm portion 100 with a wave-like edge surface having three recesses 104, 106 and 108 formed thereon. The rounded protrusion 112 between the recesses 106 and 108 is slightly higher than the rounded protrusion 110 between the recesses 104 and 106, for a purpose to be described.

A spring-loaded roller detent 114 is rotatably mounted on a pin 115 supported by a hollow spring-loaded plunger 116 having a coil spring 119 mounted therein. The plunger 116 and coil spring 119 are mounted in a wall of the cover member 34, urging the roller detent 114 into contact with the surfaces of the elements 104, 110, 106, 112 and 108 so as to ride therealong upon rotation of the select shaft 36. The action of the torsion spring legs 96 and 98 against the fixed abutment 90 causes the roller detent 114 to seat against the center recess 106 when the select shaft 36 and the associated plate member 82 are at rest. For later operational identification, the plane through the recess 104 defines the ¼ position, the plane through the recess 106 defines the ¾ position, and the plane through the recess 108 defines the 5/R position, representing the five manual shifts and reverse of the transmission 12.

A reverse inhibitor assembly 117 is mounted within the cover member 34 and extends downwardly therefrom. The assembly 117 includes a mounting bracket 118 having a straight fixed arm 120 extending laterally therefrom in a direction away from the flared portion 102, and a bent fixed arm 122 extending downwardly therefrom and bent toward the selector mechanism 54. A fixed rivet 124 is mounted through an opening 126 formed in the mounting bracket 118, with a spring retainer flange 128 formed on the inner end thereof. A reverse inhibitor lever 130 is pivotally mounted around the fixed rivet 124 against the mounting bracket 118, and includes radially extending, straight-sided arms 132 and 134, and a generally triangular-shaped cam arm 136 with a rounded apex 137 formed substantially directly opposite the arm 134. A torsion spring 138 is mounted around the fixed rivet 124 intermediate the reverse inhibitor lever 130 and the flange 128, with legs 140 and 142 extending therefrom and bent so as to normally confine the arms 132 and 120 therebetween in side-by-side alignment. In this position, the arm 134 extends downwardly in a location intermediate the straight fixed arm 120 and the bent fixed arm 122.

OPERATION

Generally, movement of the shift control lever 20 laterally rotates the select shaft 36 and the associated transmission 12 into one of three FIRST/SECOND, THIRD/FOURTH, and FIFTH/REVERSE selector positions, comparable to points A, B and C of the FIG. 7 shift pattern, and movement of the shift control lever 20 longitudinally rotates the shift shaft 38 in one direction into FIRST (1), THIRD (3) or FIFTH (5), or in the opposite direction into SECOND (2), FOURTH (4) or REVERSE (R) selected shift positions, in manners to be explained.

Inasmuch as the shift shaft 38 is rotatable only, cable angularity resulting from sliding action is eliminated. Being rotatable, rather than slidable, also results in lower seal drag and eliminates the need for an external shaft cover or boot.

Figure 2:
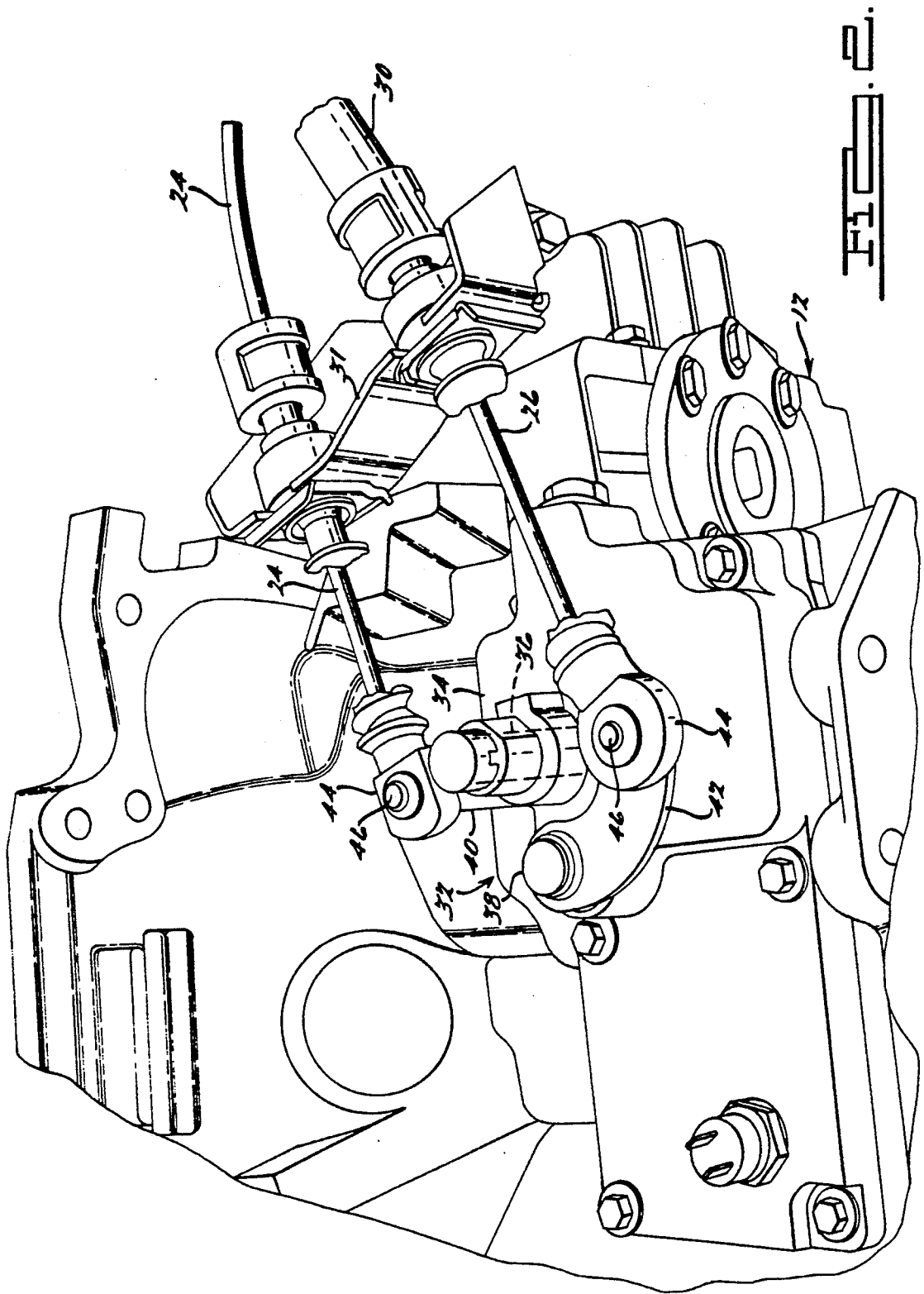
FIG. 2 is an enlarged fragmentary perspective view of a portion of the FIG. 1 structure.
Figure 3:
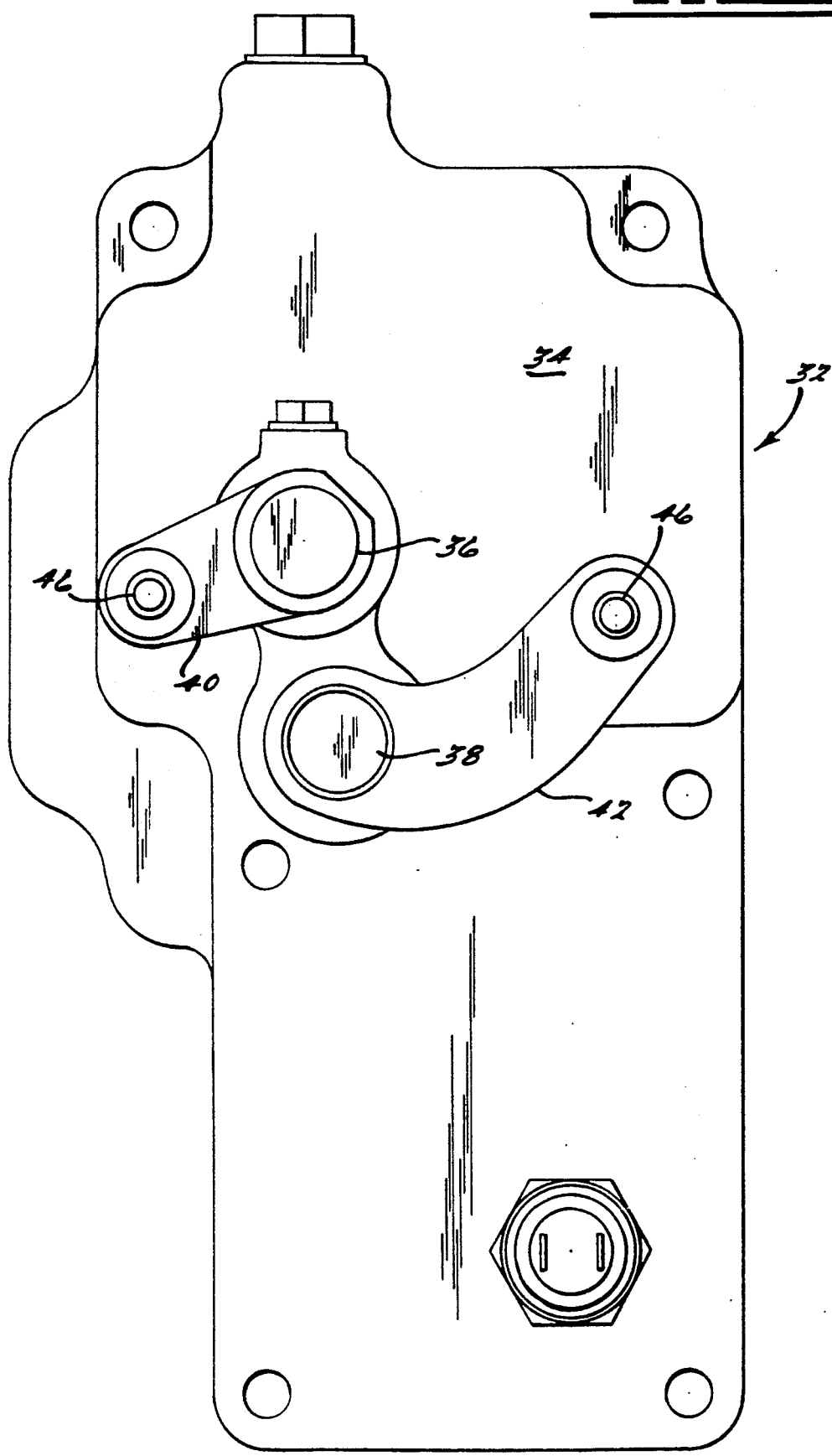
FIG. 3 is a plan view of components of the FIG. 2 structure.

When the select shaft 36 is rotated in a clockwise direction in FIGS. 2 and 6 via the select cable 24, responding to the manual movement of the control lever 20, the flared portion 102 of the plate member 82 is pivoted in a counterclockwise direction, bringing the ¼ recess 104 into contact with the spring-loaded roller detent 114 and, simultaneously, moving the spring actuator member 86 against the force of the spring leg 96 and the ball-shaped member 88 in the trough 60 such that the selector mechanism 54 is rotated about the rod 48 in a counterclockwise direction in FIG. 5. This positions the finger 68 such that rotation of the shift shaft 38 moves the selector mechanism 54 via the lever arm 76, and, hence, the finger 68 along the rod 48 to selectively actuate oppositely disposed shift rail lugs 144 (FIG. 11) of the transmission 12 into either FIRST or SECOND ratio positions.

Movement of the shift control lever 20 laterally to the ¼ position rotates the select shaft 36 and the associated flared end 102 so as to position the center recess 106 against the spring-actuated roller 114, causing the ball-like member 88 to position the selector mechanism 54 such that the finger 68 is positioned between a second pair of the rail lugs 144. Inasmuch as the protrusion 112 is higher than the protrusion 110, there results a higher selector load from the ¾ position to the 5/R position than from the ¾ position to the ½ position, thereby reducing the likelihood of an inadvertent 2 to 5 shift. Movement of the shift control lever 20 longitudinally in one direction or the other rotates the shift shaft 38 and the associated lever arm 76 to slide the selector mechanism 54 along the rod 48 to cause the finger 68 to move the selected rail lug of the transmission 12 into either THIRD or FOURTH ratio position. As such, the reverse inhibitor assembly 117 remains in the ¾ neutral position shown in FIG. 8.

Movement of the shift control lever 20 laterally to the 5/R position attains the engagement of the recess 108 and the roller 114 and rotation of the selector mechanism 54 via the ball-like member 88 such that, as a result of the longitudinal movement of the shift control lever 20 and the resultant rotation of the shift shaft 38 and the lever arm 76, the finger 68 can now be slid along the rod 48 moving the finger 68 and the selected rail lug into one of the FIFTH or REVERSE ratio positions. As the pin member 70 passes the reverse inhibitor assembly 117, the respective arms are as shown in FIG. 9.

It should be noted at this point that, when FIFTH gear is selected, the arm 134 is released from a position adjacent the spring arm 142, permitting the spring arm 140 to urge the finger 132 into a position aligned with the fixed arm 120. This causes the arm 134 to move into a position intermediate the arm 120 and the bent end arm 122, and the triangular cam arm 136 into an upwardly extending orientation. In the latter position, the cam arm 136 will interfere with the pin 70 of the selector mechanism 54 if the driver were to pull straight back on the shift control lever 20 in the process of down shifting from FIFTH, blocking any inadvertent selection of REVERSE. In this event, when the pin 70 contacts the cam arm 136, it will first cause the arm 134 to rotate into abutting engagement with the bent end portion of the fixed bent arm 122, as shown in FIG. 10, in turn, causing, via the ball-like member 88 and the action of the torsion spring 92, the flared end 102 to pivot from the 5/R position into the ¾ position. Further pressure on the shift control lever 20 causes the finger 68 of selector mechanism 54 to engage the FOURTH gear, as illustrated by the phantom line shown in FIG. 7, with the pin 70 tracking as shown in FIG. 10.

Figure 11:
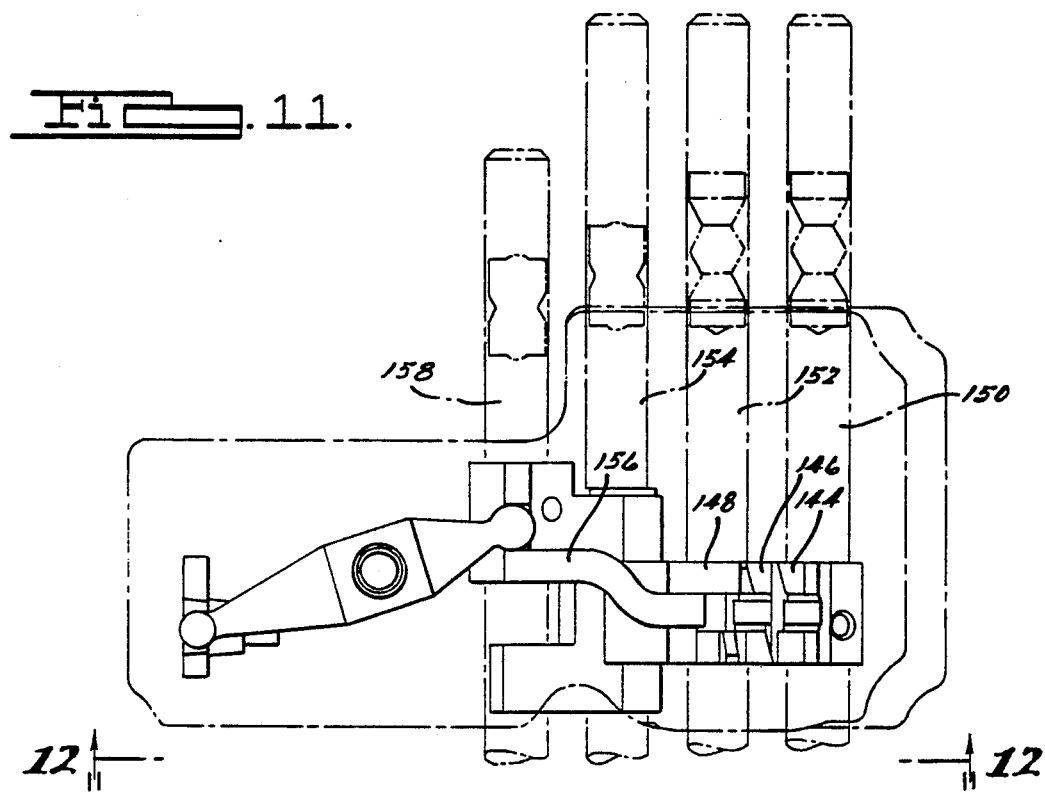
FIG. 11 is a view of the internal transmission components actuated by the FIGS. 1-6 arrangement.
Figure 12:
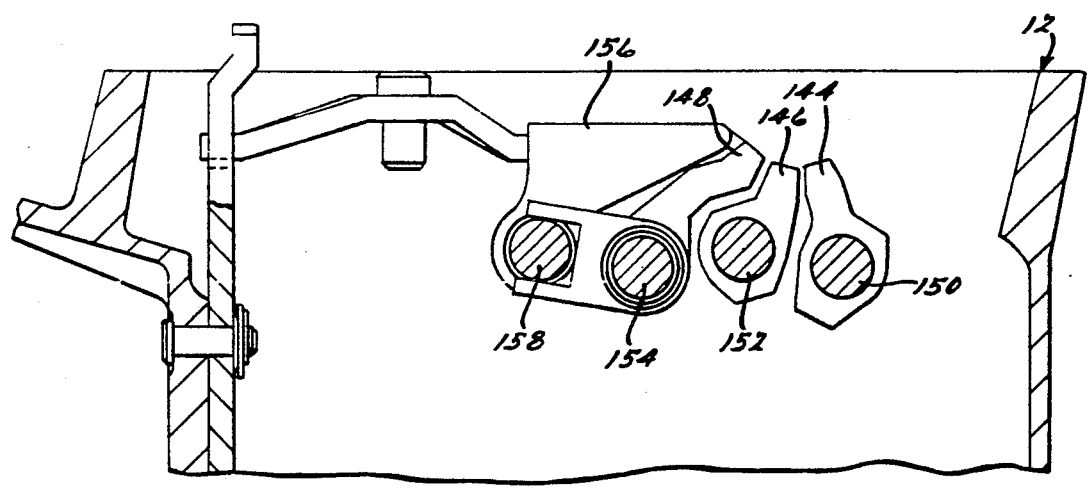
FIG. 12 a fragmentary cross-sectional view taken along the plane of the line 12—12 of FIG. 11, and looking in the direction of the arrows.

As shown in FIGS. 11 and 12, shift rail lug members 144, 146 and 148 serve to actuate respective shift rails 150 for FIRST/SECOND, 152 for THIRD/FOURTH, and 154 for FIFTH, and an elongated lug member 156 serves to actuate the REVERSE rail 158.

Referring now to FIGS. 13 and prior art FIG. 14, it may be noted that the shift finger 68, operating intermediate the oppositely disposed legs of the respective shift rail lug members 144, 146 or 148, may be substantially shorter (FIG. 13) than a prior art shift finger 160 (FIG. 14) of a type which is pivoted about a fixed pivot point 162 in an arcuate path to move one or the other of a pair of oppositely disposed taller legs of a shift rail lug member 164. The latter pivotable shift finger 160 must slide upwardly along the surface of an adjacent leg of the shift rail lug member 164 as it pushes same, whereas the shift finger 68 pushes directly against an adjacent leg of one of the shift rail lug members 144, 146 or 148 without any relative movement therebetween.

INDUSTRIAL APPLICABILITY

It should be apparent that the invention provides improved dual rotatable shift and select shafts, with low seal drag and improved cable routing thereto, and a rotational and sliding selector mechanism actuated thereby, with resultant shorter shift finger design and, hence, lower component stress levels and reduction in part sizes and weight.

While but one embodiment has been shown and described, other modifications thereof are possible within the scope of the following claims.

The embodiments of the invention in which an exclusive property or privilege is claimed are defined as follows:

1. A transmission shift control apparatus comprising a two-directional moveable shift control lever, a housing, shift finger means rotatably and slidably mounted in said housing, select and shift shafts rotatably mounted through a wall of said housing, first linkage means operatively connected between one end of said select shaft and said shift finger means, second linkage means operatively connected between the inner end of said shift shaft and said shift finger means, and dual push-pull cables operatively interconnected between said shift control lever and the other ends of said respective select and shift shafts for rotating said select shaft and said shift finger means in response to movement of said shift control lever in one direction, and for rotating said shift shaft and sliding said shift finger means in response to movement of said shift control lever in the other direction.

2. A transmission shift control apparatus comprising a shift control lever, a housing, rotatable selector and shift shafts extending out of said housing, a lever arm secured to said other end of each of said shafts, a pair of push-pull cables connected between said shift control lever and respective lever arms adapted to selectively rotate said select and shift shafts in response to lateral and longitudinal movement of said shift control lever, a fixed rod mounted in said housing, a spindle member slidably and rotatably mounted on said fixed rod, a shift finger formed on said spindle member, first linkage means operatively connected between one end of said select shaft and said spindle member for rotating said spindle member on said fixed rod in response to rotation of said select shaft by the lateral movement of said shift control lever via one of said cables to position said shift finger in a predetermined radial position around said fixed rod, and second linkage means operatively connected between the inner end of said shift shaft and said spindle member for sliding said spindle member along said fixed rod in response to rotation of said shift shaft by the longitudinal movement of said shift control lever via the other of said cables to move said shift finger through a predetermined arc.

3. The transmission shift control apparatus described in claim 2, wherein a trough is formed along the length of said spindle member, and said first linkage means includes a lever arm having one end thereof mounted on said one end of said select shaft and a ball-like member formed on the other end thereof and mounted in said trough for rotating said spindle member and, hence, said shift finger on said fixed rod in response to said lateral movement of said shift control lever.

4. The transmission shift control apparatus described in claim 2, wherein a pair of arcuate-shaped flanges are formed laterally across said spindle member on an end thereof opposite said shift finger and defining a slot therebetween, and said second linkage means includes a lever arm having one end thereof mounted on said one end of said shift shaft and a pin member formed on the other end thereof and mounted in said slot for sliding said spindle member and, hence, said shift finger along said fixed rod in response to longitudinal movement of said shift control lever.

5. The transmission shift control apparatus described in claim 3, and a second lever arm extending from said one end of said lever arm mounted on said one end of said select shaft, a round projection formed on said lever arm on the side thereof opposite said ball-like member, a flared portion formed on an end of said second lever arm, first, second and third recesses formed in series on the edge of said flared portion, spring-loaded roller means mounted in a wall of said housing for riding in said recesses, and torsion spring means operatively connected among said select shaft and said round projection and a fixed abutment formed on a wall of said housing, said torsion spring means serving to urge said flared portion into a position where said second recess is the seat for said spring-loaded roller means, and whereby the seating of said spring-loaded roller means in said first recess is indicative of said shift finger being in a first radial position wherein slidable movement of said shift finger through the plane of said first radial position results in a FIRST or SECOND gear or ratio; the seating of said spring-loaded roller means in said second recess is indicative of said shift finger being in a second radial position wherein slidable movement of said shift finger through the plane of said second radial position results in a THIRD or FOURTH gear ratio; and the seating of said spring-loaded roller means in said third recess is indicative of said shift finger being in a third radial position wherein slidable movement of said shift finger through the plane of said third radial position results in a FIFTH or REVERSE gear ratio.

6. The transmission shift control apparatus described in claim 5, and a pin formed on a side of said spindle member, and reverse inhibitor means mounted on a surface of said housing for cooperation with said pin to prevent the inadvertent sliding movement of said shift finger from said FIFTH gear ratio position into said REVERSE gear ratio position, and instead, to cause said shift finger to rotate from said FIFTH gear ratio position into said FOURTH gear ration position.

* * * * *